(12) United States Patent
Elliot et al.

(10) Patent No.: US 10,454,604 B2
(45) Date of Patent: Oct. 22, 2019

(54) ENCODED AUDIO SYNCHRONIZATION

(71) Applicant: Bose Corporation, Framingham, MA (US)

(72) Inventors: Michael W. Elliot, Grafton, MA (US); Debasmit Banerjee, Framingham, MA (US); Rameshwar Sundaresan, Shrewsbury, MA (US)

(73) Assignee: Bose Corporation, Framingham, MA (US)

( * ) Notice: Subject to any disclaimer, the term of this patent is extended or adjusted under 35 U.S.C. 154(b) by 127 days.

(21) Appl. No.: 14/874,124

(22) Filed: Oct. 2, 2015

(65) Prior Publication Data

US 2017/0098466 A1    Apr. 6, 2017

(51) Int. Cl.
*H04J 3/06* (2006.01)
*H04R 27/00* (2006.01)

(52) U.S. Cl.
CPC .......... *H04J 3/0641* (2013.01); *H04J 3/0661* (2013.01); *H04R 27/00* (2013.01); *H04R 2227/003* (2013.01); *H04R 2227/005* (2013.01); *H04R 2420/07* (2013.01)

(58) Field of Classification Search
CPC ........ G06F 1/12; G06F 1/1632; G06F 13/426; G06F 13/4291; G06F 13/4295; G06F 19/3406; H04L 2012/2841; H04R 3/12; H04R 25/554; H04R 2227/005; H04R 2420/07; H04W 4/008; H04W 8/005; H04W 56/00; H04W 56/0015; H04W 84/18; H04W 84/20; H04W 88/06
USPC ....... 370/328, 329, 338, 350, 471, 503, 508, 370/509, 510, 512, 514; 381/2, 59, 77, 381/79, 80; 455/41.2, 41.3, 3.06; 700/94; 704/E19.048; 709/208; 710/106
See application file for complete search history.

(56) References Cited

U.S. PATENT DOCUMENTS

| 5,087,980 A | 2/1992 | Staffer |
| 5,530,859 A | 6/1996 | Tobias, II et al. |
| 5,655,144 A | 8/1997 | Milne et al. |

(Continued)

FOREIGN PATENT DOCUMENTS

| WO | 96/01540 A2 | 1/1996 |
| WO | 98/56135 A2 | 12/1998 |
| WO | 00/76272 A1 | 12/2000 |
| WO | 01/08366 A1 | 2/2001 |
| WO | 03/058830 A1 | 7/2003 |

OTHER PUBLICATIONS

Sang H. Son and Nipun Agarwal; "Synchronization of Temporal Constructs in Distributed Multimedia Systems with Controled Accuracy"; Department of Computer Science, University of Virginia; Charlottesville, VA; pp. 550-555; 1994.

(Continued)

*Primary Examiner* — Duc Nguyen
*Assistant Examiner* — Alexander L Eljaiek
(74) *Attorney, Agent, or Firm* — Brian M. Dingman; Dingman IP Law, PC (57) ABSTRACT

A method of synchronizing playback of audio over a plurality of wireless speaker packages that are each adapted to play audio, where the audio comprises a plurality of frames of encoded audio data. The method includes determining an offset time of a frame of encoded audio data, where the offset time corresponds to the time when the frame playback is to begin, and inserting the determined offset time into the frame of encoded audio data.

14 Claims, 4 Drawing Sheets

(56) References Cited

U.S. PATENT DOCUMENTS

| | | | |
|---|---|---|---|
| 5,951,690 | A | 9/1999 | Baron et al. |
| 5,987,106 | A | 11/1999 | Kitamura |
| 6,134,379 | A | 10/2000 | LaMacchia |
| 6,285,405 | B1 | 9/2001 | Binford, Jr. et al. |
| 6,469,633 | B1 | 10/2002 | Wachter |
| 6,631,410 | B1 | 10/2003 | Kowalski et al. |
| 7,023,833 | B1 | 4/2006 | Aiello et al. |
| 7,391,791 | B2 | 6/2008 | Balassanian et al. |
| 7,483,538 | B2 | 1/2009 | McCarty et al. |
| 7,643,894 | B2 | 1/2010 | Braithwaite et al. |
| 7,668,964 | B2 * | 2/2010 | Millington ............... H04L 65/80 709/231 |
| 7,917,082 | B2 | 3/2011 | Goldberg et al. |
| 8,050,203 | B2 * | 11/2011 | Jacobsen ............... H04L 1/1829 370/310 |
| 8,234,395 | B2 * | 7/2012 | Millington ............ H04J 3/0664 709/231 |
| 8,588,949 | B2 | 11/2013 | Lambourne et al. |
| 8,942,252 | B2 | 1/2015 | Balassanian et al. |
| 9,195,258 | B2 | 11/2015 | Millington |
| 9,213,357 | B2 | 12/2015 | Millington |
| 2002/0031196 | A1 | 3/2002 | Muller et al. |
| 2002/0067909 | A1 | 6/2002 | Iivonen |
| 2002/0131398 | A1 | 9/2002 | Taylor |
| 2003/0050989 | A1 | 3/2003 | Marinescu et al. |
| 2004/0008661 | A1 | 1/2004 | Myles |
| 2004/0136375 | A1 | 7/2004 | Koguchi |
| 2006/0013208 | A1 | 1/2006 | Rietschel et al. |
| 2007/0142944 | A1 | 6/2007 | Goldberg et al. |
| 2008/0291863 | A1 * | 11/2008 | Agren .................. H04J 3/0632 370/315 |
| 2010/0115119 | A1 | 5/2010 | Gallo et al. |
| 2014/0277644 | A1 | 9/2014 | Gomes-Casseres et al. |

OTHER PUBLICATIONS

U.S. Appl. No. 14/848,212, filed Sep. 8, 2015.
ESCIENT; FireBall; DVD and Music Manager; DVDM-100; Installation and User's Guide; Manual No. M22003-01A3; Revision 1.2 Jul. 2004; copyright @2003-2004.
ESCIENT; FireBall; E2 User's Manual; P/N M22004-01A3.
ESCIENT; FireBall; AVX & MX Series User's Manual; P/N: M42001-02A1.
Palenchar, Joseph; Avega Uses Wireless, UPnP to Network Home Speakers; TWICE; Jan. 5, 2006; pp. 1-3; downloaded from the internet on Dec. 18, 2017; http://www.twice.com/product/avega-upnp-network-home-speakers-2973.
Phillips, Wes; Avega: Wireless Is More; Stereophile.com; Jan. 4, 2006; downloaded from the internet on Dec. 18, 2017; https://www.stereophile.com/ces2006/010406avega/index.html.
Kobrin, Mike; Avega's Oyster Is a Pearl; Wireless audio doesn't have to sound just so-so anymore; News & Opinion; PCMag.com; Jan. 6, 2006; downloaded from internet Dec. 18, 2017; https://www.pcmag.com/article2/0,2817,1908704.00.asp.
Wilkins, Nathaniel; Escient Fireball DVDM-100 review-CNET; Reviewed Dec. 14, 2004; downloaded from the internet on Dec. 18, 2017; https://www.cnet.com/products/escient-fireball-dvdm-100/review/.
Howard, Bill; Escient FireBall DVDM-100 Review & Rating; PCMag.com; Mar. 16, 2004; downloaded from the internet on Dec. 18, 2017; https://www.pcmag.com/article2/0,2817,1549587,00.asp.
Wilkins, Nathaniel; Escient FireBall E2 Digital Music Server review—CNET; Jun. 14, 2006; downloaded from the internet on Dec. 18, 2017; https://www.cnet.com/products/escient-fireball-e2-400-400gb/review/.
Wilkins, Nathaniel; Escient FireBall E-40 Digital Music Manager review -CNET; Oct. 12, 2003; downloaded from internet on Dec. 18, 2017; https://cnet.com/products/escient-fireball-e-40-digital-music-manager/review/.
Antonoff, Michael; Escient FireBall SE-80 Digital Music Manager; Sound & Vision; Oct. 4, 2005; downloaded from the internet on Dec. 18, 2017; https://www.soundandvision.com/content/escient-fireball-se-80-digital-music-manager.
Digital Trends Staff; Wi-Fi Pearl to be Found in Oyster Speakers?; Digital Trends; posted on Jan. 2, 2006; downloaded from the internet on Dec. 18, 2017; https://www.digitaltrends.com/home-theater/wi-fi-pearl-to-be-found-in-oyster-speakers/.
Wikipedia; Universal Plug and Play; downloaded from the internet on Jan. 10, 2018; pp. 1-10; https://en.wikipedia.org/wiki/Universal_Plug_and_Play.

* cited by examiner

ENCODED AUDIO SYNCHRONIZATION

BACKGROUND

This disclosure relates to synchronizing playback of encoded audio data among two or more wireless speaker packages.

Multi-room wireless audio systems can include a master device that receives audio data from a source and distributes it to the slaves. All of the devices are easily synchronized when they are all playing a track from the beginning of the data stream. However, if a slave is added while a track is already playing, the slave is not in the same state as the master and so the slave cannot be synchronized with the master without proper seeding.

SUMMARY

All examples and features mentioned below can be combined in any technically possible way.

In one aspect, a method of synchronizing playback of audio over a plurality of wireless speaker packages that are each adapted to play audio, where the audio comprises a plurality of frames of encoded audio data, includes determining an offset time of a frame of encoded audio data, where the offset time corresponds to the time when the frame playback is to begin relative to the start of the audio data stream, and inserting the determined offset time into the frame of encoded audio data.

Embodiments may include one of the following features, or any combination thereof. The offset times of a plurality of frames of encoded audio data may be determined. Each of the wireless speaker packages may comprise an encoded data buffer that stores frames of encoded audio data. At least some of the frames stored in the encoded data buffer of the master playback device may further comprise the inserted determined offset times of the respective frames. At least some of the frames stored in the encoded data buffer of the master playback device may comprise frame headers, and the determined offset times of the respective frames may be inserted into the frame headers. At least some of the frames that are stored in the encoded data buffer of the master playback device with the inserted determined offset times of the respective frames may be distributed by the master playback device to the slave playback devices. The method may further comprise synchronizing the playback of audio among the master playback device and a synchronized slave playback device, and wherein after the synchronizing, the frames that are distributed by the master playback device to the synchronized slave playback device do not include frame offset times.

Embodiments may include one of the above and/or below features, or any combination thereof. Each of the wireless speaker packages may comprise a decoder that decodes encoded data that is stored in the encoded data buffer of the respective wireless speaker package, and a decoded data buffer that stores frames of decoded audio data. The decoded data buffers of each of the wireless speaker packages may store offset times along with the frames of decoded audio data. The decoder of the master playback device may determine the offset time for each frame of encoded audio data stored in the encoded data buffer of the master playback device. At least one of the slave devices may use the offset time that it determines for its playback of the corresponding frame, and the master device may use the offset time as determined by the master device for its playback of the corresponding audio frame.

Embodiments may include one of the above and/or below features, or any combination thereof. The decoder of the master playback device may further determine information about the content of decoded audio samples in one or more frames of encoded audio data stored in the encoded data buffer of the master playback device. The determined information about the content of decoded audio samples may include, as non-limiting examples, a checksum on the samples, or a quantity of samples. This determined information can be stored in the master encoded data buffer along with each respective frame (e.g., in the frame header), before the frames are distributed to the slave playback devices. The slave playback devices may also determine the same information about the content of decoded audio samples in frames of encoded audio data they receive from the master playback device. A slave playback device may synchronize playback of audio with a master playback device based at least in part on a match between the information determined by the master about the content of decoded audio samples in a frame that was stored in the master encoded data buffer along with the respective frame, and the same information about the content of decoded audio samples in the same frame as determined by the slave playback device. The master playback device may determine and provide to at least one slave playback device a play at time for audio received from an audio source, where the offset time defines the time when a frame begins playback after the play at time, and wherein the master playback device and the slave playback device have clocks that are both synchronized to a common reference clock, and wherein the slave playback device synchronizes playback of audio with the master playback device beginning by playing a first frame when the play at time plus the offset for that first frame equals the current synchronized clock time.

In another aspect, a method of synchronizing playback of audio over a master wireless speaker package and a slave wireless speaker package that are each adapted to play audio, where the audio comprises a plurality of frames of encoded audio data, where the master wireless speaker package plays frames of decoded audio data that each comprise a frame header that includes information about the content of decoded audio samples in the frame, and where the slave wireless speaker package receives from the master wireless speaker package encoded frames that include in the frame header the information about the content of decoded audio samples that are present in the frame, includes the slave wireless speaker package determining the information about the content of decoded audio samples in a frame that it received from the master wireless speaker package, and the slave wireless speaker package beginning playback based at least in part on the slave wireless speaker package determining that the information it determined about the content of decoded audio samples in a frame that it received from the master wireless speaker package matches the information about the content of decoded audio samples in the header of the same frame. The master wireless speaker package may also determine and provide to at least one slave wireless speaker package a play at time for audio received from an audio source, where the offset time corresponds to the time when a frame begins playback after the play at time, and wherein the master wireless speaker package and the slave wireless speaker package have clocks that are both synchronized to a common reference clock, and wherein the slave wireless speaker package synchronizes playback of audio with the master wireless speaker package beginning by playing a first frame when the play at time plus the offset for that first frame equals the current synchronized clock time.

In another aspect, a wireless speaker package includes an electro-acoustic transducer, a processor, and memory comprising instructions which when executed by the processor cause the wireless speaker package to determine an offset time of a frame of encoded audio data, where the offset time corresponds to the time when the frame playback is to begin, and then to insert the determined offset time into the frame of encoded audio data.

In another aspect, a method of synchronizing playback of audio over a plurality of wireless speaker packages that are each adapted to play audio, where the audio comprises a plurality of frames of encoded audio data, includes synchronizing respective clocks on the plurality of wireless speaker packages, obtaining the plurality of frames of encoded audio data at each of the plurality of wireless speaker packages, and at each playback device decoding the plurality of frames of encoded audio data to provide a plurality of frames of decoded audio data, determining a corresponding offset time for each of the plurality of frames of decoded audio data, wherein the offset time corresponds to the time when playback of the associated frame is to begin, storing the decoded audio frames and the corresponding offset times in a decoded audio buffer, and rendering the decoded audio data based on a play at time and the offset times, wherein the play at time represents a time to begin rendering a first frame of the decoded audio data.

Embodiments may include one of the following features, or any combination thereof. One of the plurality of wireless speaker packages may be a master playback device that receives encoded audio data from an audio source, arranges the encoded audio data into a plurality of frames to obtain the plurality of frames of encoded audio data, and distributes the plurality of frames of encoded audio data to the rest of the plurality of wireless speaker packages, which function as slave playback devices. The master device may also distribute the play at time to the slave playback devices. At least the master playback device may update respective headers of the plurality of frames of encoded audio to include corresponding ones of the offset times. The method may further comprise distributing one or more of the frames of encoded audio with the corresponding offset time to one or more additional slave playback devices to enable the one or more additional slave playback devices to synchronize playback of the audio with the master playback device after the master playback device has already begun rendering the decoded audio data. Synchronizing respective clocks on the plurality of wireless speaker packages may comprise synchronizing the respective clocks to a common reference clock.

DETAILED DESCRIPTION

Synchronized playback of an audio stream by two or more wireless speaker packages can be accomplished using a master-slave architecture under which one wireless speaker package serves as a master and receives and distributes to the other wireless speaker packages a stream of encoded audio data. When a slave desires to join an already playing stream, it must sync with the master. Synchronization can be accomplished herein by the master determining an offset time of a frame of encoded audio data, where the offset time corresponds to the time when the frame playback is to begin (relative to the start of the stream of audio data), and inserting the determined offset time into the frame of encoded audio data. When these frames are sent to the slaves, the slaves are able to synchronously join the playback.

Figure 1:
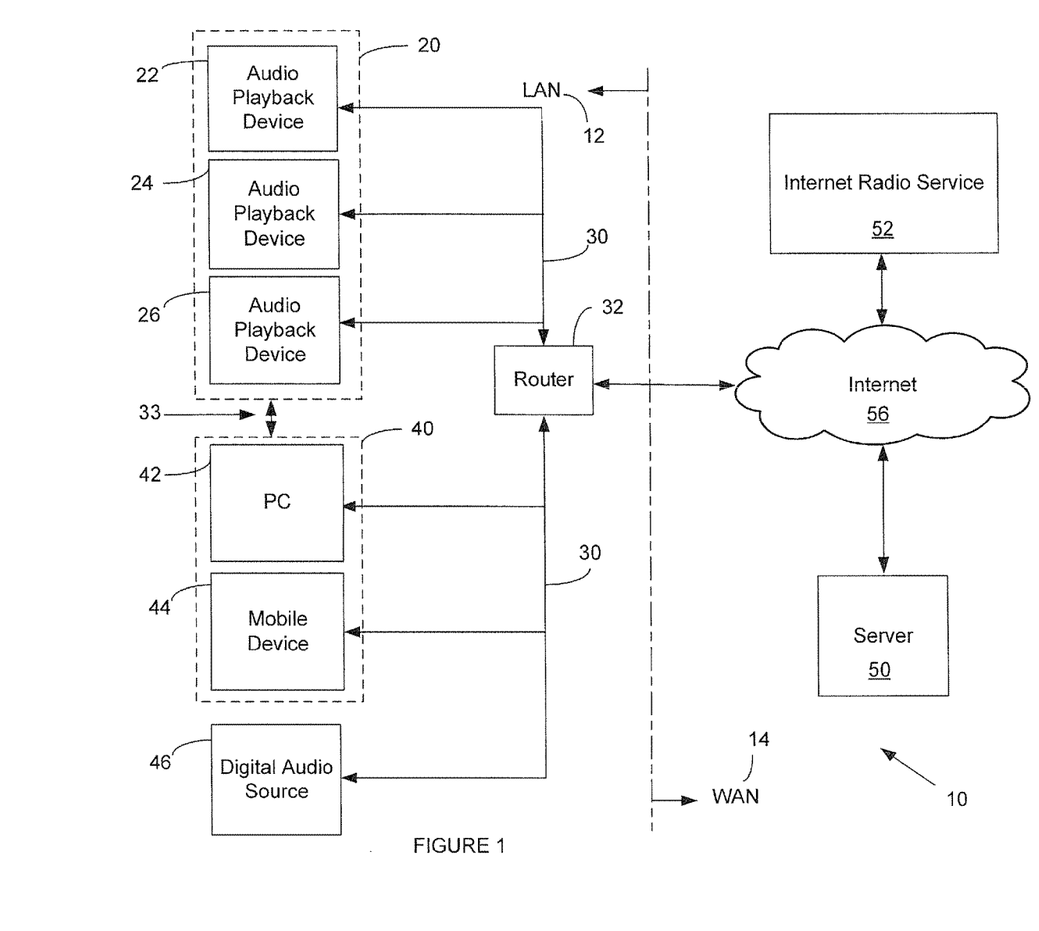
FIG. 1 is a schematic block diagram of an audio distribution system that can be used in the present method, and includes an audio source and a wireless speaker package according to this disclosure.

Audio distribution system 10, FIG. 1, can be used to accomplish encoded audio synchronization, and also includes non-limiting examples of wireless speaker packages and other wireless audio sources and sinks that can be involved in this encoded audio synchronization. System 10 is adapted to deliver digital audio (e.g., digital music). System 10 includes a number of audio playback devices 22, 24 and 26 which are among the group of audio output devices 20 of the system. In one non-limiting embodiment, the audio playback devices are identical wireless speaker packages that each include a digital to analog converter that is able to receive digital audio signals and convert them to analog form. The wireless speaker packages also include an electro-acoustic transducer that receives the analog audio signals and transduces them into sound. The wireless speaker packages also include a processor. The wireless speaker packages can be connected to one another and also connected to the router/access point 32 via network 30. The wireless speaker packages are thus able to communicate with one another. Network 30 can be a wired and/or wireless network, and can use known network connectivity methodologies. Network 30 is part of local area network (LAN) 12 which is connected to wide area network (WAN) 14, in this non-limiting example by connection to Internet 56. LAN 12 also includes one or more separate computing devices 40 and/or one or more separate local digital audio sources 46. In this non-limiting example the computing devices include a personal computer 42 and a mobile computing device 44 such as a smartphone, tablet or the like. One or more of computing devices 40 may be connected to one or more of audio output devices 20 by a personal area network (PAN) 33 (e.g., a wireless PAN). PAN 33 may comprise a direct point-to-point Bluetooth connection between mobile device 44 and one of audio playback devices 22, 24 or 26. WAN 14 includes server 50 and Internet radio service 52 which can both communicate with LAN 12 via Internet 56.

One use of system 10 is to play an audio stream over one or more of the audio playback devices in group 20. The sources of digital audio provide access to content such as audio streams that move over network 30 and/or network 33 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 46, and media server applications such as may be found on a mobile computing device, can also be sources of audio data. Typically, the user selects the audio source and the playback devices via PC 42 and/or mobile device 44.

Figure 2:
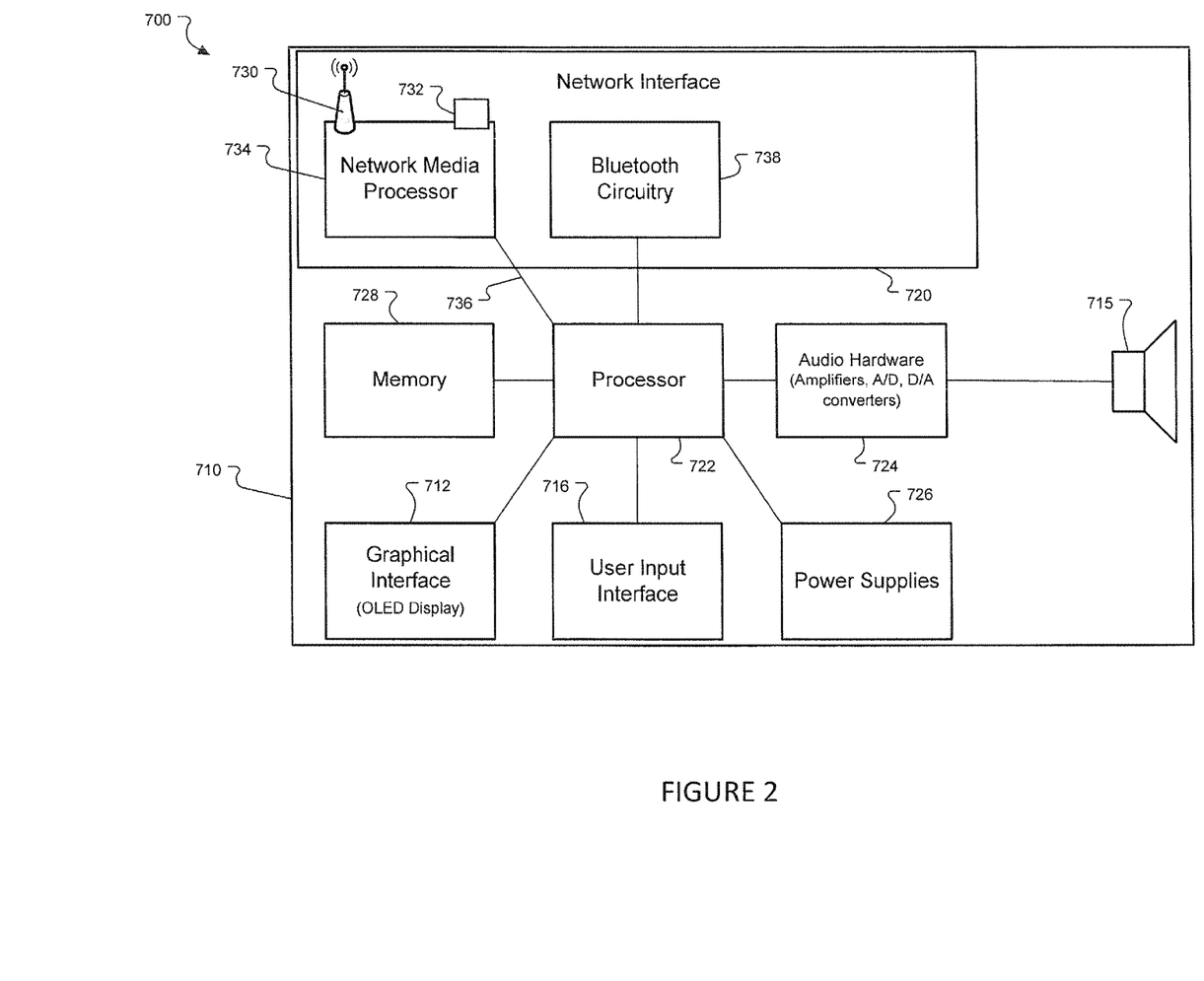
FIG. 2 is a block diagram of an exemplary wireless speaker package.

FIG. 2 illustrates an exemplary wireless speaker package as an example of this disclosure. Wireless speaker package 700 includes an enclosure 710. On the enclosure 710 there resides a graphical interface 712 (e.g., an OLED display) which can provide the user with information regarding currently playing ("Now Playing") music. There are one or more electro-acoustic transducers 715. Wireless speaker package device 700 also includes a user input interface 716. The user input interface 716 can include a plurality of preset indicators, which can be hardware buttons. The preset indicators can provide the user with easy, one press access to entities assigned to those buttons. The assigned entities can be associated with different ones of the digital audio sources such that a single wireless speaker package 700 can provide for single press access to various different digital audio sources.

Wireless speaker package 700 also includes a network interface 720, a processor 722, audio hardware 724, power supplies 726 for powering the various components, and memory 728. Each of the processor 722, the graphical interface 712, the network interface 720, the audio hardware 724, the power supplies 726, and the memory 728 are interconnected using various buses, and several of the components may be mounted on a common motherboard or in other manners as appropriate.

The network interface 720 provides for communication between the wireless speaker package 700 and audio sources and other networked wireless speaker packages and other audio playback devices via one or more communications protocols. The network interface 720 may provide either or both of a wireless interface 730 and a wired interface 732. The wireless interface 730 allows the wireless speaker package 700 to communicate wirelessly with other devices in accordance with a communication protocol such as IEEE 802.11 b/g. The wired interface 732 provides network interface functions via a wired (e.g., Ethernet) connection.

In some cases, the network interface 720 may also include a network media processor 734 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device.

All other digital audio coming from network packets comes straight from the network media processor 734 through a USB bridge 736 to the processor 722 and runs into the decoders, DSP, and eventually is played back (rendered) via the electro-acoustic transducer(s) 715.

The network interface 720 can also include a Bluetooth circuitry 738 for Bluetooth applications (e.g., for wireless communication with a Bluetooth enabled audio source such as a smartphone or tablet).

Streamed data passes from the network interface 720 to the processor 722. The processor 722 can execute instructions within the wireless speaker package (e.g., for performing, among other things, digital signal processing, decoding, and equalization functions), including instructions stored in the memory 728. The processor 722 may be implemented as a chipset of chips that include separate and multiple analog and digital processors. The processor 722 may provide, for example, for coordination of other components of the audio playback device 700, such as control of user interfaces, applications run by the audio playback device 700. A suitable processor is the DA921 available from Texas Instruments.

The processor 722 provides a processed digital audio signal to the audio hardware 724 which includes one or more digital-to-analog (D/A) converters for converting the digital audio signal to an analog audio signal. The audio hardware 724 also includes one or more amplifiers which provide amplified analog audio signals to the electroacoustic transducer(s) 715 for playback. In addition, the audio hardware 724 may include circuitry for processing analog input signals to provide digital audio signals for sharing with other devices.

The memory 728 may include, for example, flash memory and/or non-volatile random access memory (NVRAM). In some implementations, instructions (e.g., software) are stored in an information carrier. The instructions, when executed by one or more processing devices (e.g., the processor 722), perform one or more processes, such as those described elsewhere herein. The instructions can also be stored by one or more storage devices, such as one or more computer- or machine-readable mediums (for example, the memory 728, or memory on the processor). The instructions may include instructions for performing decoding (i.e., the software modules include the audio codecs for decoding the digital audio streams), as well as digital signal processing and equalization. Additional details may be found in U.S. Patent Application Publication 2014/0277644, the disclosure of which is incorporated herein by reference.

Figure 3:
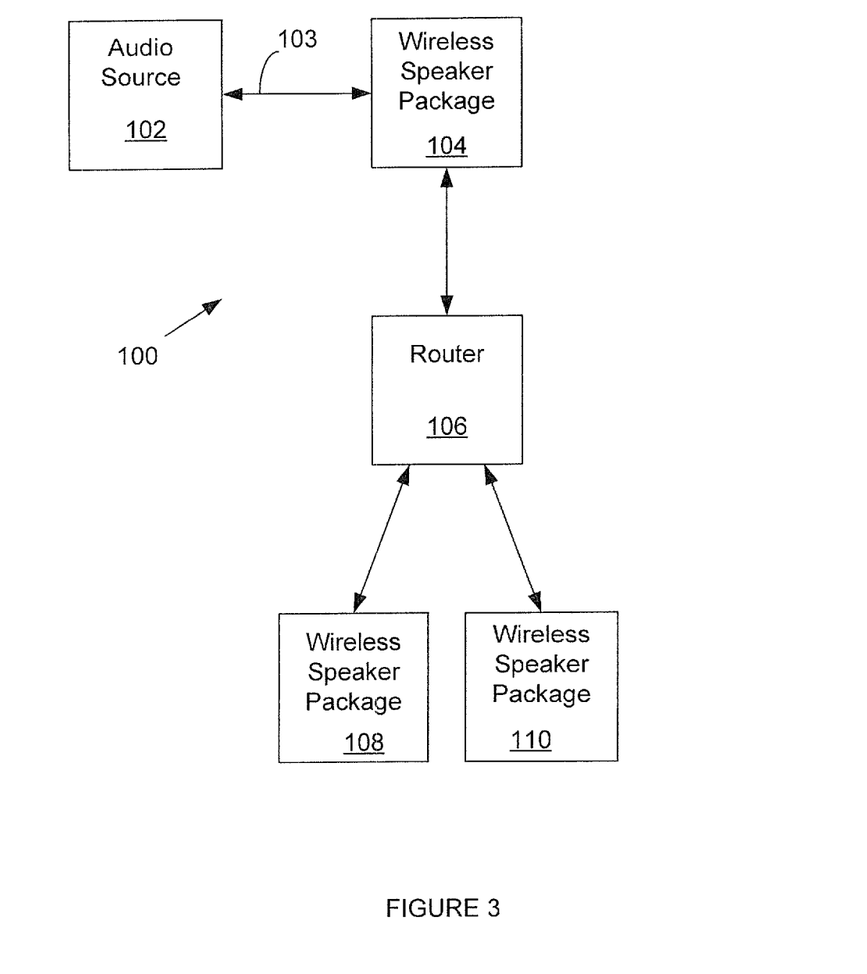
FIG. 3 is a schematic block diagram of a wireless interconnection of an audio source and several wireless speaker packages using a wireless access point.

Audio system 100, FIG. 3, can be used for the encoded audio synchronization herein. System 100 includes audio source 102 that communicates with wireless speaker package 104 over wireless network 103. Network 103 may be a Bluetooth network, or it may use any other wireless communication network protocol now known or hereafter developed. System 100 includes one or more additional wireless speaker packages 108 and 110. Normally but not necessarily, in the case where there are multiple wireless speaker packages that are part of system 100, one wireless speaker package (wireless speaker package 104 in this case) functions as the master device and the other wireless speaker packages (108 and 110 in this case) function as the slave wireless speaker packages. Master device 104 receives audio data from source 102 and distributes it to slaves 108 and 110. In this non-limiting example such audio distribution can be by WiFi via wireless access point/router 106, but distribution could be by any other wireless or wired network protocol, such as a wireless LAN. Each of wireless speaker packages 104, 108 and 110 will play the audio. The audio replay among the wireless speaker packages can be (but need not be) synchronized such that they all play the same audio at the same time.

The slave devices may be synched to the master using a clock synchronization algorithm that keeps the current clock time on all of the slave devices synchronized with that of the master device. The devices all have clocks that are synched to a common reference clock. The clock synchronization algorithm is separate and aside from the audio stream. The clock synchronization algorithm clock data can be provided by the master to the slaves every 1 to 6 seconds to keep the slave devices updated and in sync with the master. Separately, the master device provides a "play at" time to the slave devices. This "play at" time represents the time that the devices are to start playing a first sample in an audio track or stream. The "play at" time is communicated in control data that is separate from the audio stream and is only sent once for each track (i.e., it is not included with every frame). Every new track or stream will get a new "play at" time.

The slave devices receive the first sample in a track or stream and begin playback at the designated "play at" time. Since all devices have the same current clock time, due to the clock synchronization algorithm, they all begin playback at the same time. From there, the devices all provide playback at a constant sample rate, and, consequently, stay in sync.

The oscillators on the individual devices may spin at different rates, which could lead to time drift among the devices. Synchronization adjustments to the clock time may cause the duration of audio that the corresponding slave device needs to play to stay in sync to either grow or shrink. An asynchronous sample rate converter (ASRC) on board each audio device accounts for these time adjustments and manipulates the received audio data to ensure a constant sample output rate.

The master device adds a time stamp to the header of each frame in the audio stream that represents a time offset from the "play at" time—i.e., the time difference between the time when playback of the corresponding frame should start and the "play at" time. Unlike the "play at" time and the clock data, this time stamp is provided in the audio stream. This time stamp is used by the slave devices for determining when the corresponding frame is fed into the ASRC. This time stamp roughly corresponds to a time in the future when the associated frame is to be fed into the ASRC. This time stamp is actually a time offset. i.e., it is some delta from an initial start time (i.e., "play at" time) of the playback of the audio.

Following is one non-limiting example of two different master-slave synchronization schemes that can be employed, one where audio data is streaming from a WiFi source and another where the audio data is streamed from a Bluetooth source. The synchronization of the playback among the various devices can involve two separate, but related concepts including staying in sync and a slave synchronously joining a data stream that is being played by at least one other device (the master).

When the source uses WiFi, Network Time Protocol (NTP) is used to keep the current clock time on all of the slave devices synchronized with that of the master device. The NTP is separate and aside from the audio stream. The NTP clock data is provided every 1 to 6 seconds to keep the slave devices updated and in sync with the master.

Separately, the master device provides a "play at" time to the slave devices. This "play at" time represents the time that the devices are to start playing a first sample in an audio stream. The "play at" time is communicated in control data that is separate from the audio stream and is only sent once for each track (i.e., it is not included with every frame). Every new track or stream will get a new "play at" time.

The slave devices receive the first sample in a stream and begin playback at the designated "play at time." Since all devices have the same current clock time, due to the NTP, they all begin playback at the same time. From there, the devices all provide playback at a constant sample rate, and, consequently, stay in sync.

Figure 4:
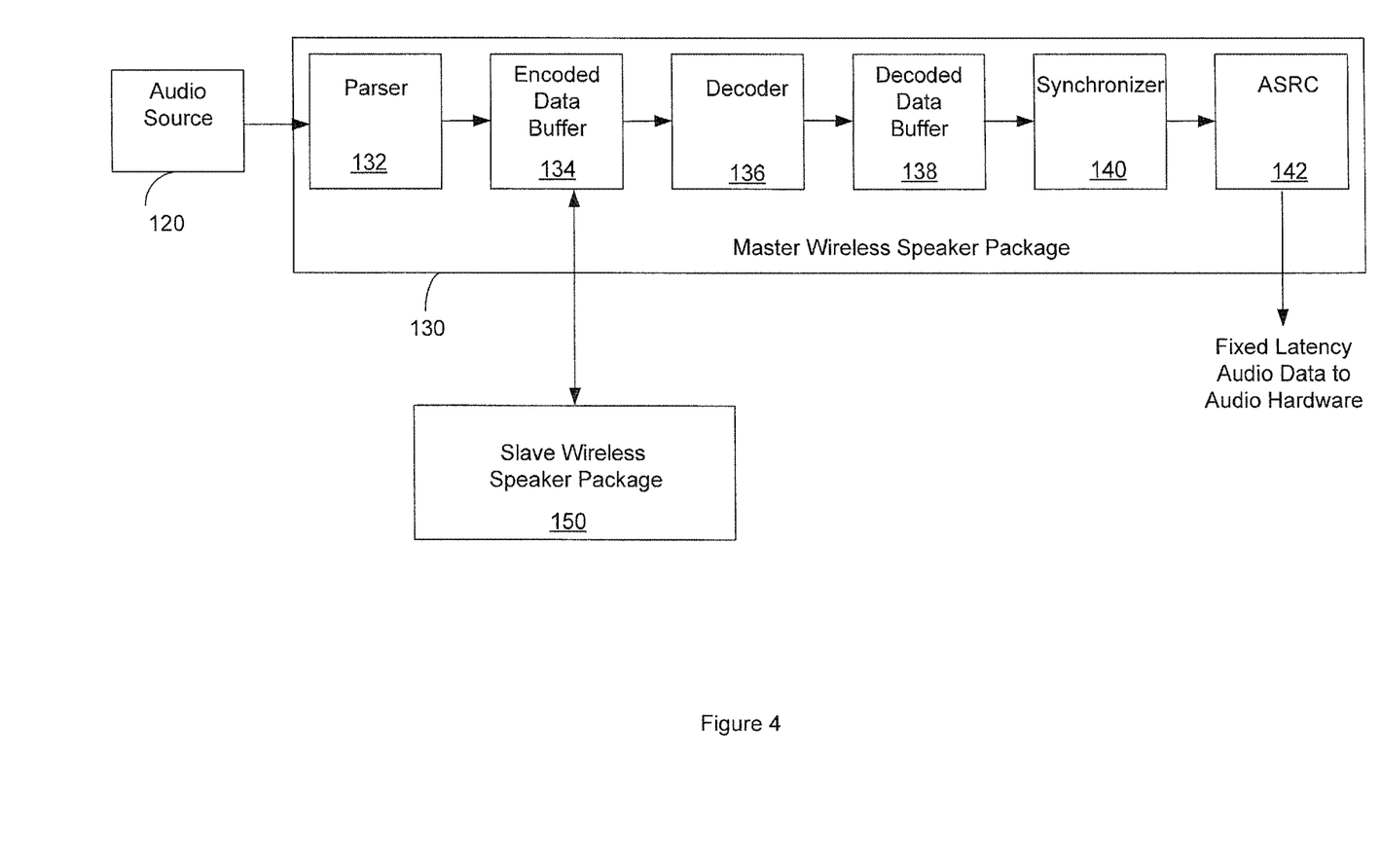
FIG. 4 is a schematic block diagram of functional aspects of a master wireless speaker package.

As shown in FIG. 4, master wireless speaker package 130 includes a parser 132 that receives encoded audio data from audio source 120. Wireless speaker package 130 also includes buffer 134 (e.g., a ring buffer) that stores encoded audio data and decoder 136 that decodes the encoded audio data and performs other functions as described elsewhere herein. Buffer 138 (e.g., a ring buffer) stores decoded audio data. Wireless speaker package 130 also includes synchronization module 140 and asynchronous sample rate converter (ASRC) 142. The parser, decoder, synchronizer and ASRC can all be accomplished with software running on processor 722 (FIG. 2). The slaves include the same functional components as master 130, but the slave's parser receives encoded audio data from the master rather than the slave receiving data from source 120.

At the beginning of a stream, the data (encoded audio) starts to flow from source 120 to master playback device 130 (a/k/a master) where it is parsed by the master's parser 132 to identify frame boundaries. The parser strips away any container (e.g., MPEG) that encoded audio is packed in and puts it into new frames. The parsed but still encoded data is stored in the master's encoded data buffer 134. Next, the encoded data is decoded by decoder 136. Decoder 136 also generates a time offset for each frame and affixes the offset to the header of the decoded audio frame. The decoded audio frames are stored in the decoded data buffer 138. The offset is also pushed back into encoded data buffer 134 and plays a role in a new slave seamlessly (synchronously) joining an ongoing stream, as discussed below. The offset represents a time difference between the time when playback of the corresponding frame should start and the "play at" time. The offset is used by synchronization module 140 to determine when the audio samples from the corresponding audio frame are fed into ASRC 142. ASRC 142 ensures a constant sample rate for rendering. Decoder 136 also determines information about the content of the decoded audio samples, such as a checksum on the samples or the quantity of audio samples in the frames, and appends this determined information to the header of the frames that are stored in encoded data buffer 134.

For multi-device synchronization, the encoded data (i.e., the stored fames along with their headers) is immediately pulled out of the master's encoded data buffer 134 and is provided to slave playback device 150, which has the same components as master 130. The encoded data passes unchanged through the slave's parser and is stored in the encoded data buffer of each slave. From there, the slaves follow the same process as outlined above with respect to the master. Each slave will decode the encoded audio pulled from the master, assign an offset to the frame header, and store the decoded audio frames in their respective sample buffers. The slaves each apply their own offsets to the audio frames, but these offsets will be the same as those applied by the master since the each device is receiving the same stream and is using the same decoder software. These offsets are never changed or updated.

Since the clocks on the master and slaves are in sync and the offsets are all the same, each device will feed the same data into its ASRC at the same time. The ASRCs ensure that each device outputs the audio at the same, constant rate. The oscillators on the individual devices may spin at different rates, which could lead to time drift among the devices despite the NTP synchronization. Synchronization adjustments to the clock time may cause the duration of audio that the corresponding slave device needs to play to stay in sync to either grow or shrink. The ASRCs on each device account for these time adjustments and manipulate the received audio data to ensure a constant sample output rate.

As the master decodes the audio it assigns the offset, and, in addition to storing the decoded audio frame in the sample buffer, the decoder also goes back and fills in the offset and information about the content of decoded audio sample (such as a checksum on the decoded audio samples or the number of decoded audio samples) in the header of the corresponding encoded audio frame in encoded data (ring) buffer 134. A slave device joining the group mid-stream will receive the "play at" time from the master and, like all of the other slaves, will pull the audio data from the master's encoded data buffer. In this case, since the master has already started to decode the audio, the offset and content information (such as number of samples) for the already decoded audio will be available in the frame header for the corresponding encoded audio frame in the master's encoded data buffer.

This offset information is provided with the first "n" frames and the joining slave uses this information to sync to the stream. In that regard, each audio codec has a different look back period that is required to be able to sync to the stream and get the joining slave's decoder in the same state as the master's. Once the decoders are in the same state, the process will proceed as discussed above with regard to staying in sync.

State matching between the decoder of the joining slave and the master can be based on information about the content of decoded audio samples that was placed into the frame header by the master. The slave's decoder will determine this same information about the content of the frames received from the master. When this information matches the same information that was placed into the frame header by the master, the slave is now in sync with the master. The slave is now able to begin synchronized playback of audio data. Actual slave playback will then begin when the play at time plus the offset time of this (or a later) frame equals the NTP time; if the times are not equal the slave must either wait for that time to come or dispose of data.

Synchronization can be handled somewhat differently when the audio data is streamed from a source device (e.g., a mobile phone) via Bluetooth. Bluetooth sources vary dramatically in their: a) data rate; b) packet size and the duration of audio per packet; and c) inter packet arrival times. Many aspects of a Bluetooth device's environment and settings can cause variations in these conditions. These include: i) use of WiFi frequency (2.4 GHz vs. 5 GHz); ii) RF environment (noise levels); and iii) the device's WiFi/Bluetooth coexistence strategy (if any).

When a wireless speaker initiates Bluetooth playback, each Bluetooth audio packet is time-stamped with its arrival time at the speaker. A Bluetooth device also time-stamps each audio packet when it is sent. The master device then determines the frame offset based on a comparison of the arrival time stamps (a/k/a the speaker time stamps) and the send time stamp (a/k/a source time stamp), such as described in U.S. patent application Ser. No. 14/848,212, filed Sep. 8, 2015, which is incorporated herein by reference. This is all done before the audio packet even gets parsed. Thus, for Bluetooth audio sync the offset information is already present in the header information of the encoded audio for all frames when the slave device(s) pull the encoded audio from the master's ring buffer.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method of synchronizing playback of audio over a plurality of wireless speaker packages that are each adapted to play audio, where the audio comprises an audio track or stream that comprises a plurality of frames of encoded audio data, wherein one of the plurality of wireless speaker packages is a master playback device that receives encoded audio data from an audio source and distributes the encoded audio data to the rest of the plurality of wireless speaker packages, which function as slave playback devices, wherein each of the wireless speaker packages comprises an encoded data buffer that stores frames of encoded audio data, and wherein each of the wireless speaker packages comprises a decoder that decodes encoded data that is stored in the encoded data buffer of the respective wireless speaker package and a decoded data buffer that stores frames of decoded audio data, and wherein the master playback device and the slave playback devices have clocks that are synchronized, the method comprising:

the master playback device determining and providing to the slave playback devices a play at time for audio received from an audio source, wherein the play at time is provided to the slave playback devices separately from the audio data and is provided only once per track or stream;

using the decoder of the master playback device to determine an offset time for each of a plurality of frames of encoded audio data, where the offset time defines the time after the play at time when the playback of the respective frame is to begin;

using the decoder of the master playback device to determine a checksum on the decoded audio samples or the quantity of audio samples in the frame for each frame of encoded audio data stored in the encoded data buffer of the master playback device;

inserting the determined offset time into the respective frame of encoded audio data;

storing in the encoded data buffer of the master playback device the encoded frames along with the inserted determined offset times and the determined checksum on the decoded audio samples or the quantity of audio samples for the respective frames;

distributing frames from the master encoded data buffer to each of the slave playback devices;

wherein the slave playback devices also determine the checksum on the decoded audio samples or the quantity of audio samples in the frame, for each frame of encoded audio data they receive from the master playback device;

wherein the slave playback devices synchronize playback of audio with the master playback device based at least in part on a match between the determined checksum on the decoded audio samples or the quantity of audio samples in the frame determined by the master and that was stored in the master encoded data buffer along with the respective frame, and the checksum on the decoded audio samples or the quantity of audio samples in the frame as determined by the slave playback device; and wherein the slave playback devices synchronize playback of audio with the master playback device beginning by playing a first frame when the play at time plus the offset for that first frame equals the current synchronized clock time;

wherein a joining slave playback device is configured to join an ongoing playback of a track or stream by the master playback device, by:
  the joining slave playback device pulling from the encoded data buffer of the master playback device a plurality of encoded frames along with the inserted determined offset times and the determined checksums or the quantity of audio samples for each of the plurality of pulled encoded frames; and
  placing the decoders of the joining slave playback device and the master playback device in the same state, wherein the state is based on a match between the master playback device and the joining slave playback device on the checksum on the audio samples or the quantity of audio samples in the plurality of pulled encoded frames.

2. The method of claim 1 wherein at least some of the frames stored in the encoded data buffer of the master playback device comprise frame headers, and the determined offset times of the respective frames are inserted into the frame headers before the frames are distributed to the slave playback devices.

3. The method of claim 2 wherein after synchronizing the playback of audio, the frames that are distributed by the master playback device to the synchronized slave playback device do not include offset times.

4. The method of claim 2 wherein the decoded data buffers of each of the wireless speaker packages store offset times along with the frames of decoded audio data.

5. A method of synchronizing playback of audio over a master wireless speaker package and a slave wireless speaker package that are each adapted to play audio, where the audio comprises an audio track or stream that comprises a plurality of frames of encoded audio data, where the master wireless speaker package plays frames of decoded audio data that each comprise a frame header that includes a checksum on decoded audio samples or the quantity of audio samples in the frame, and where the slave wireless speaker package receives from the master wireless speaker package encoded frames that include in the frame header the checksum on decoded audio samples or the quantity of audio samples in the frame, and wherein the master wireless speaker package and the slave wireless speaker package have clocks that are synchronized to a common reference clock, the method comprising:
  the slave wireless speaker package receiving from the master wireless speaker package a play at time for audio received from an audio source, wherein the play at time is provided to the slave wireless speaker package separately from the audio data and is provided only once per track or stream;
  the slave wireless speaker package receiving from the master wireless speaker package frames of audio data that each comprise an offset time that defines the time after the play at time when the playback of the respective frame is to begin;
  the slave wireless speaker package determining the checksum on decoded audio samples or the quantity of audio samples in a frame that it received from the master wireless speaker package;
  the slave wireless speaker package beginning playback based at least in part on the slave wireless speaker package determining a match between the checksum on decoded audio samples or the quantity of audio samples in the frame determined by the master, and the checksum on decoded audio samples or the quantity of audio samples in the frame as determined by the slave; and
  wherein the slave wireless speaker package synchronizes playback of audio beginning by playing a first frame when the play at time plus the offset for that first frame equals the current synchronized clock time;
  wherein a joining slave playback device is configured to join an ongoing playback of a track or stream by the master playback device, by:
    the joining slave playback device pulling from the encoded data buffer of the master playback device a plurality of encoded frames along with the inserted determined offset times and the determined checksums or the quantity of audio samples for each of the plurality of pulled encoded frames; and
    placing the decoders of the joining slave playback device and the master playback device in the same state, wherein the state is based on a match between the master playback device and the joining slave playback device on the checksum on the audio samples or the quantity of audio samples in the plurality of pulled encoded frames.

6. The method of claim 1, wherein the respective clocks on the plurality of wireless speaker packages are all synchronized to a common reference clock.

7. The method of claim 1, wherein each wireless speaker package further comprises an asynchronous sample rate converter that is adapted to manipulate a duration of played audio data to maintain synchronization among all of the playback devices by ensuring that each playback device outputs audio at the same rate.

8. The method of claim 7, wherein the asynchronous sample rate converter provides audio data to audio hardware at a constant sample rate.

9. The method of claim 8, wherein decoded audio samples are fed to the asynchronous sample rate converter and wherein the offset time in a frame is used by the slave audio playback devices to determine when the corresponding frame is fed to the asynchronous sample rate converter.

10. The method of claim 5, wherein each wireless speaker package further comprises an asynchronous sample rate converter that is adapted to manipulate a duration of played audio data to maintain synchronization among all of the wireless speaker packages by ensuring that each wireless speaker package outputs audio at the same rate.

11. The method of claim 10, wherein the asynchronous sample rate converter provides audio data to audio hardware at a constant sample rate.

12. The method of claim 11, wherein decoded audio samples are fed to the asynchronous sample rate converter and wherein the offset time in a frame is used by the slave wireless speaker package to determine when the corresponding frame is fed to the asynchronous sample rate converter.

13. The method of claim 1, wherein each frame that is received from the audio source by the master playback device comprises a source time that indicates when the frame was sent by the source, and wherein the master playback device adds to each frame before it is stored in a data buffer an arrival time when the frame arrived at the master playback device.

14. The method of claim 13, wherein the offset time for each frame determined by the master playback device is based on a comparison of the arrival time and the source time.

* * * * *